(12) United States Patent
Hotta et al.

(10) Patent No.: US 7,952,980 B2
(45) Date of Patent: May 31, 2011

(54) OPTICAL PICKUP APPARATUS

(75) Inventors: Tohru Hotta, Nagano (JP); Ryoichi Kawasaki, Gunma (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 223 days.

(21) Appl. No.: 12/395,184

(22) Filed: Feb. 27, 2009

(65) Prior Publication Data
US 2009/0201791 A1    Aug. 13, 2009

(30) Foreign Application Priority Data

Feb. 29, 2008 (JP) .................................. 2008-048985

(51) Int. Cl.
*G11B 7/135* (2006.01)
(52) U.S. Cl. .............................. 369/112.28; 369/112.21
(58) Field of Classification Search ............ 369/112.21, 369/112.09, 112.14, 112.28
See application file for complete search history.

(56) References Cited

U.S. PATENT DOCUMENTS

| | | | | |
|---|---|---|---|---|
| 5,418,769 A | * | 5/1995 | Inoue | 369/112.28 |
| 5,428,596 A | * | 6/1995 | Hineno et al. | 369/112.16 |
| 5,477,386 A | * | 12/1995 | Okuda et al. | 359/669 |
| 2004/0013078 A1 | * | 1/2004 | Nagashima et al. | 369/120 |

FOREIGN PATENT DOCUMENTS

JP    2006-099875    4/2006

* cited by examiner

*Primary Examiner* — Joseph Haley
*Assistant Examiner* — Nicholas Lee
(74) *Attorney, Agent, or Firm* — Fish & Richardson P.C.

(57) ABSTRACT

An optical-pickup apparatus comprising: a polarization beam splitter fixed to a base, which includes a first prism that laser light emitted from a laser diode enters, a second prism that return light of the laser light reflected from a signal recording layer of an optical disc enters, and a control film that is formed on either one of opposed surfaces of the first and second prisms so that the laser light and the return light are selectively passed through or reflected from the control film, the opposed surfaces being opposed to each other; and first and second positioning pins provided on the base to position the polarization beam splitter, the polarization beam splitter being fixed to the base in a state where the opposed surface of at least one of the first and second prisms is made in contact with at least one of the first and second positioning pins.

6 Claims, 4 Drawing Sheets

OPTICAL PICKUP APPARATUS

CROSS-REFERENCE TO RELATED APPLICATION

This application claims the benefit of priority to Japanese Patent Application No. 2008-048985, filed Feb. 29, 2008, of which full contents are incorporated herein by reference.

BACKGROUND OF THE INVENTION

1. Field of the Invention

The present invention relates to an optical pickup apparatus that performs an operation of reading a signal recorded in an optical disc.

2. Description of the Related Art

An optical disc device has been widespread, which is capable of performing a signal reading operation by applying laser light emitted from an optical pickup apparatus to a signal recording layer provided in the optical disc.

An operation is performed of reading a signal recorded in the signal recording layer by the optical pickup apparatus by applying the laser light emitted from a laser diode to the signal recording layer and by detecting a change in the laser light reflected from the signal recording layer by a photodetector.

In order to read a signal recorded in the signal recording layer with the laser light, it is necessary to accurately perform a focusing control operation of focusing the laser light to the signal recording layer and a tracking control operation of making the laser light to follow a signal track provided in a spiral state in the signal recording layer.

While there are various methods for performing such a focusing control operation, an astigmatism method using generation of astigmatism is employed in general. While there are also various tracking control methods, a three-beam method using a main beam and two sub beams are generally employed.

Moreover, in order to perform an accurate focusing control operation, a differential astigmatism method using not only a main beam but also a sub beam has recently been employed. In the differential astigmatism method used for the focusing control operation and the three-beam method used for the tracking control operation, a photodetector is provided including two light receiving portions for sub beams to which two sub beams are applied, respectively, and a light receiving portion for main beam to which a main beam is applied is provided. A focus error signal and a tracking error signal are generated from signals obtained by the photodetector, to perform the control operations. Since such an art is well-known, the description will be omitted.

In order to accurately perform the operation of reading a signal recorded in the optical disc and an operation of recording a signal in the optical disc with the optical pickup apparatus, it is an indispensable condition to accurately perform the above-mentioned focusing control operation and the tracking control operation. In order to accurately perform the focusing control operation and the tracking control operation, fixed positions of components making up the optical pickup apparatus or particularly of optical components making up an optical path of the laser light are required to be accurate.

As an element for changing and controlling the optical path of the laser light, an optical component called polarization beam splitter is in widespread use, and the polarization beam splitter is so made up that two prisms are opposed and bonded to each other in such a manner as to sandwich therebetween a control film for selectively controlling transmission and reflection. The polarization beam splitter is provided so as to guide the laser light emitted from the laser diode in a direction of an objective lens provided so as to be focused on the signal recording layer included in the optical disc and so as to guide return light, which is laser light reflected from the signal recording layer, to the photodetector. Therefore, if the mounting position of the polarization beam splitter is not accurate, the above-mentioned control operations in the optical pickup apparatus can not accurately be performed.

An art has been developed for fixing the polarization beam splitter included in the optical pickup apparatus at an accurate position (See Japanese Patent Laid-Open Publication No. 2006-99875.)

In the art disclosed in the above-mentioned publication, the position of the prism making up the polarization beam splitter can be fixed accurately, however, a position is specified of the outside of the prism making up the polarization beam splitter. Therefore, if the polarization beam splitter itself is not manufactured accurately, a position of a polarization surface for controlling reflection and transmission can not be fixed at the accurate position, which is a problem.

SUMMARY OF THE INVENTION

An optical pickup apparatus according to an aspect of the present invention, comprises: a polarization beam splitter fixed to a base, the polarization beam splitter including a first prism that laser light emitted from a laser diode enters, a second prism that return light of the laser light reflected from a signal recording layer of an optical disc enters, and a control film that is formed on either one of an opposed surface of the first prism and an opposed surface of the second prism so that the laser light incident on the first prism and the return light incident on the second prism are selectively passed through or reflected from the control film, the opposed surfaces being opposed to each other; a first positioning pin provided on the base so as to position the polarization beam splitter; and a second positioning pin provided on the base so as to position the polarization beam splitter, the polarization beam splitter being fixed to the base in a state where the opposed surface of at least one of the first prism and the second prism is made in contact with at least one of the first positioning pin and the second positioning pin.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
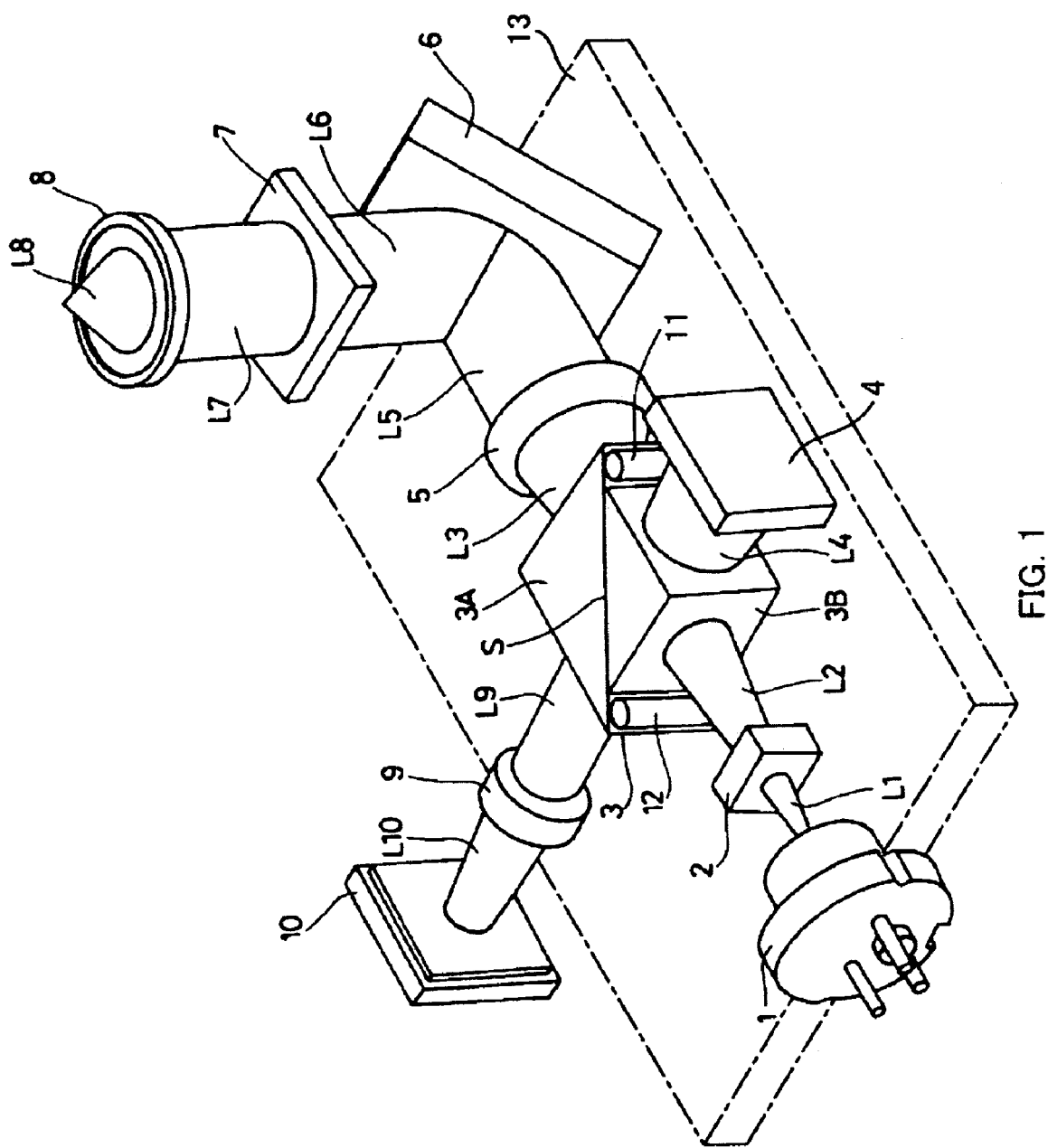
FIG. 1 is a perspective view illustrating a main part of an optical pickup apparatus according to an embodiment of the present invention.

At least the following details will become apparent from descriptions of this specification and of the accompanying drawings.

An optical pickup apparatus according to an embodiment of the present invention is provided with a polarization beam splitter including: a second prism having a control surface formed with a control film that laser light emitted from a laser diode and return light reflected from a signal recording layer of an optical disc are made incident on, and that selectively controls a transmission operation and a reflection operation of the incident laser lights; and a first prism having an opposed surface bonded and fixed to the control surface formed on the second prism. In the optical pickup apparatus, first and second positioning pins made in contact with the control surface of the second prism are provided on a base on which optical components are fixed, and the polarization beam splitter is bonded and fixed to the base in a state where the control surface of the second prism is pressed into contact with the first and second positioning pins.

In the optical pickup apparatus according to an embodiment of the present invention, an area of the control surface of the second prism made in contact with the first and second positioning pins is set larger than an area of the opposed surface of the first prism.

An optical pickup apparatus according to an embodiment of the present invention is provided with a polarization beam splitter including: a second prism having a control surface formed with a control film that laser light emitted from a laser diode and return light reflected from a signal recording layer of an optical disc are made incident on, and that selectively controls a transmission operation and a reflection operation of the incident laser lights; and a first prism that includes an opposed surface bonded and fixed to the control surface formed on the second prism, and that is the same as the second prism. In the optical pickup apparatus, a second positioning pin made in contact with the control surface of the second prism and a first positioning pin made in contact with the opposed surface of the first prism are provided on a base on which optical components are fixed, and the polarization beam splitter is bonded and fixed to the base in a state where the control surface of the second prism is pressed against the second positioning pin and the opposed surface of the first prism is pressed into contact with the first positioning pin.

In the optical pickup apparatus according to an embodiment of the present invention, an arrangement is such that either the control surface of the second prism or the opposed surface of the first prism are displaced in a direction toward the first positioning pin or the second positioning pin.

An optical pickup apparatus according to an embodiment of the present invention is provided with a polarization beam splitter including: a second prism having a control surface formed with a control film that laser light emitted from a laser diode and return light reflected from a signal recording layer of an optical disc are made incident on, and that selectively controls a transmission operation and a reflection operation of the incident laser lights; and a first prism that includes an opposed surface bonded and fixed to the control surface formed on the second prism and that is the same as the second prism. In the optical pickup apparatus, first and second positioning pins made in contact with the control surface of the second prism are provided on a base on which optical components are fixed, the second prism is bonded and fixed to the base in a state where the control surface of the second prism is pressed into contact with the first and second positioning pins, and the first prism is bonded and fixed to the base in a state where the opposed surface of the first prism is pressed into contact with the first and second positioning pins.

In an optical pickup apparatus according to an embodiment of the present invention, a position of a control surface of a second prism is determined by a first positioning pin and a second positioning pin, and thus, a control film for controlling a transmission operation and a reflection operation of the laser light can be arranged at an accurate position. Furthermore, laser light emitted from a laser diode and return light reflected from a signal recording layer of an optical disc can be applied to an accurate position in a photodetector, and a signal reading operation, a focusing control operation, and a tracking control operation in an optical pickup apparatus can accurately be performed.

First, a configuration will be described of the optical pickup apparatus referring to FIG. 1. In FIG. 1, a laser diode 1 emits laser light L1 having an output corresponding to a driving signal supplied from a laser driving circuit, and the laser light L1 is oval in cross section.

The laser light L1 emitted from the laser diode 1 enters a diffraction grating 2, and the diffraction grating 2 generates and emits laser light L2 made up of 0th order light, which is a main beam, and +1st order light and −1st order light, which are sub beams.

The laser light L2 emitted from the diffraction grating 2 enters a polarization beam splitter 3, and the polarization beam splitter 3 includes triangular prism shaped second prism 3A and first prism 3B. In Specific, each of the first prism 3B and the second prism 3A is in a shape of a triangular prism with a triangular surface having one right angle, and the prisms are opposed to each other with respect to surfaces thereof, each of which is determined by the other two angles of the triangular surface, as the opposed surfaces. A control film S for selectively controlling the transmission operation and the reflection operation of the laser light is provided between a control surface (opposed surface) 3a of the second prism 3A and an opposed surface 3b of the first prism 3B, and the control film S is formed on the control surface 3a of the second prism 3A by coating, etc, for example.

Figure 2:
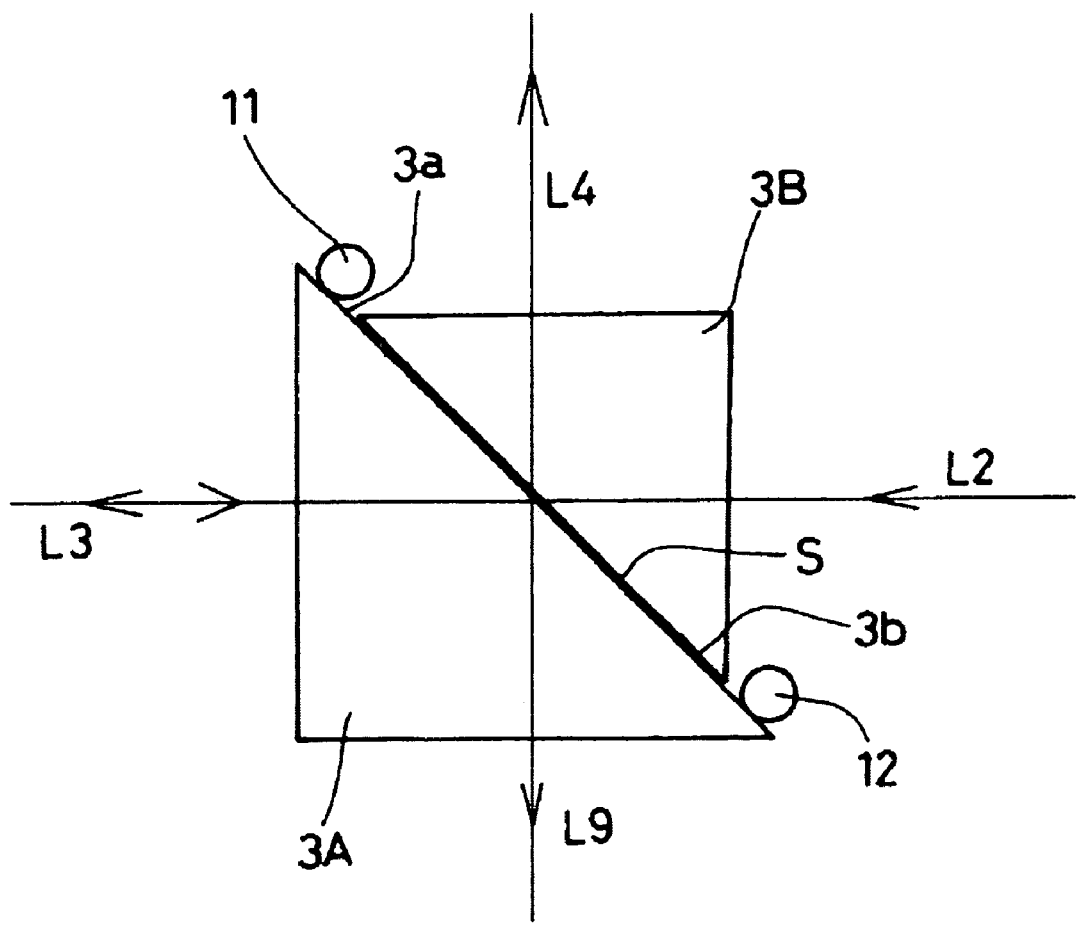
FIG. 2 is a plan view illustrating a main part of an example of a polarization beam splitter.

The polarization beam splitter 3 shown in FIG. 1 is an example according to an embodiment of the present invention, and the control surface 3a of the second prism 3A is larger in area than the opposed surface 3b of the first prism 3B as shown in FIGS. 1 and 2.

The control film S included in the polarization beam splitter 3 allows laser light L3 to be applied to the optical disc to pass therethrough, and reflects monitor laser light L4 to be applied to a front monitor diode 4 provided so as to control an output of the laser light. The control film S also reflects return light reflected from the optical disc as control laser light L9 as will be described later.

The laser light L3 having passed through the control film S of the polarization beam splitter 3 enters a collimating lens 5, and the collimating lens 5 changes the incident laser light L3 into laser light L5, which is parallel light. The laser light L5 are made incident on a reflection mirror 6 and the reflection mirror 6 reflects all of the laser light L5 in a direction of the optical disc as laser light L6. Such a reflection mirror 6 is called a raising mirror, in general.

The laser light L6 reflected by the reflection mirror 6 enters a quarter-wave plate 7, and the quarter-wave plate 7 converts a linear polarization light into a circular polarization light by shifting the phase of the laser light L6 by a quarter wavelength. Laser light L7 having passed through the quarter-wave plate 7 enters an objective lens 8, and the objective lens 8 focuses the laser light as laser light L8 focused on a signal recording layer, i.e., a signal recording surface of the signal recording layer, included in the optical disc. The objective lens 8 performs the focusing control operation through a movement operation in a perpendicular direction with respect to the signal surface of the optical disc and the tracking control operation through a movement operation in a radial direction of the optical disc. The objective lens that performs such operations is so provided as to be able to move in a focusing control direction and in a tracking control direction with four support wires, for example.

Laser light L8 applied to the signal recording layer of the optical disc with the objective lens 8, enters the objective lens 8 from the side of the optical disc as the return light reflected from the signal recording layer. The return light incident on the objective lens 8 enters the polarization beam splitter 3 through the quarter-wave plate 7, the reflection mirror 6, and the collimating lens 5, that is the same optical path.

As mentioned above, since the return light incident on the polarization beam splitter 3 has reciprocally passed through the quarter-wave plate 7, the light has been converted into laser light whose phase has been shifted by a half wavelength, that is, a linear polarization light whose polarization direction has been converted. If the return light, which is the linear polarization light obtained by converting the polarization direction, enters the polarization beam splitter 3 as above, the light is reflected by the control film S of the polarization beam splitter 3 as control laser light L9.

The control laser light L9 reflected by the control film S of the polarization beam splitter 3 enters a sensor lens 9 and the sensor lens 9 applies the control laser light L9 to a light receiving portion included in a photodetector 10 called PDIC as condensed laser light L10. The sensor lens 9 includes a cylindrical lens and the like and generates astigmatism in order to perform the focusing control operation by the astigmatism method.

As mentioned above, the optical pickup apparatus according to an embodiment of the present invention includes the laser diode 1, the diffraction grating 2, the polarization beam splitter 3, the front monitor diode 4, the collimating lens 5, the reflection mirror 6, the quarter-wave plate 7, the objective lens 8, the sensor lens 9, and the photodetector 10, and those optical components are fixed at the respective mounting positions provided on a base 13 of the optical pickup apparatus by an adhesive, etc. The base 13 is formed by a metal die cast in many cases. For convenience of description, the base 13 in FIG. 1 is partially illustrated as to a place where the polarization beam splitter 3 is fixed.

In the optical pickup apparatus shown in FIG. 1, the laser light L1 emitted from the laser diode 1 enters the objective lens 8 through the diffraction grating 2, the polarization beam splitter 3, the collimating lens 5, the reflection mirror 6, and the quarter-wave plate 7, and is applied to the signal recording layer of the optical disc by a focusing operation with the objective lens 8.

The laser light L8 applied to the signal recording layer is reflected from the signal recording layer and enters the objective lens 8 as the return light. The return light incident on the objective lens 8 enters the polarization beam splitter 3 through the quarter-wave plate 7, the reflection mirror 6, and the collimating lens 5.

The return light incident on the polarization beam splitter 3 as above is reflected by the control film S included in the polarization beam splitter 3 as the control laser light L9. The control laser light L9 obtained as above enters the sensor lens 9 and is applied to the light receiving portion included in the photodetector 10 as the condensed laser light L 10.

When the return light reflected from the signal recording layer of the optical disc is applied to the light receiving portion included in the photodetector 10, a focus error signal and a tracking error signal are generated with a four-divided sensor, etc., included in the light receiving portion, and the focusing control operation and the tracking control operation are performed using these error signals.

The optical pickup apparatus according to an embodiment of the present invention is configured as mentioned above, and an operation will next be described of fixing the polarization beam splitter 3 to the base 13.

In FIG. 1, a second positioning pin 11 and a first positioning pin 12 are fixed to the base 13. FIG. 2 illustrates a relationship between the polarization beam splitter 3 and, the second positioning pin 11 and the first positioning pin 12.

As shown in FIG. 2, the second positioning pin 11 and the first positioning pin 12 are so made up as to be in contact with the opposed surface, i.e., the control surface 3a, to which the control film S of the second prism 3A is formed. The second prism 3A and the first prism 3B are both made up in the triangular prism shape, and the polarization beam splitter 3 is assembled by bonding the control surface 3a of the second prism 3A and the opposed surface 3b of the first prism 3B with the control film S sandwiched therebetween.

The operation is performed of fixing to the base 13 the polarization beam splitter 3 manufactured as above with an ultraviolet curable adhesive, in a state where the outer portion of the opposed surface 3b of the first prism 3B in the control surface 3a of the second prism 3A is pressed into contact with the second positioning pin 11 and the first positioning pin 12, as shown in FIG. 2. That is, the polarization beam splitter 3 is fixed to the base 13 in a state where both end portions of the control surface 3a of the second prism 3A are made in contact with the first positioning pin 12 and the second positioning pin 11, respectively.

As the result of performing operations of bonding and fixing as above, the polarization beam splitter 3 is fixed to a desired mounting position on the base. A position of the control surface 3a of the second prism 3A is determined by the second positioning pin 11 and the first positioning pin 12, and in particular, the second positioning pin 11 and the first positioning pin 12 are arranged such that the first prism 3B is set therebetween, that is, the opposed surface 3b of the first prism 3B is arranged between the first positioning pin 12 and the second positioning pin 11. Therefore, the control surface 3a of the second prism 3A, that is, the control film S, can be accurately formed at a desired position. Since the control film S included in the polarization beam splitter 3 can be formed at an accurate position, optical characteristics of the optical pickup apparatus can be improved.

Figure 3:
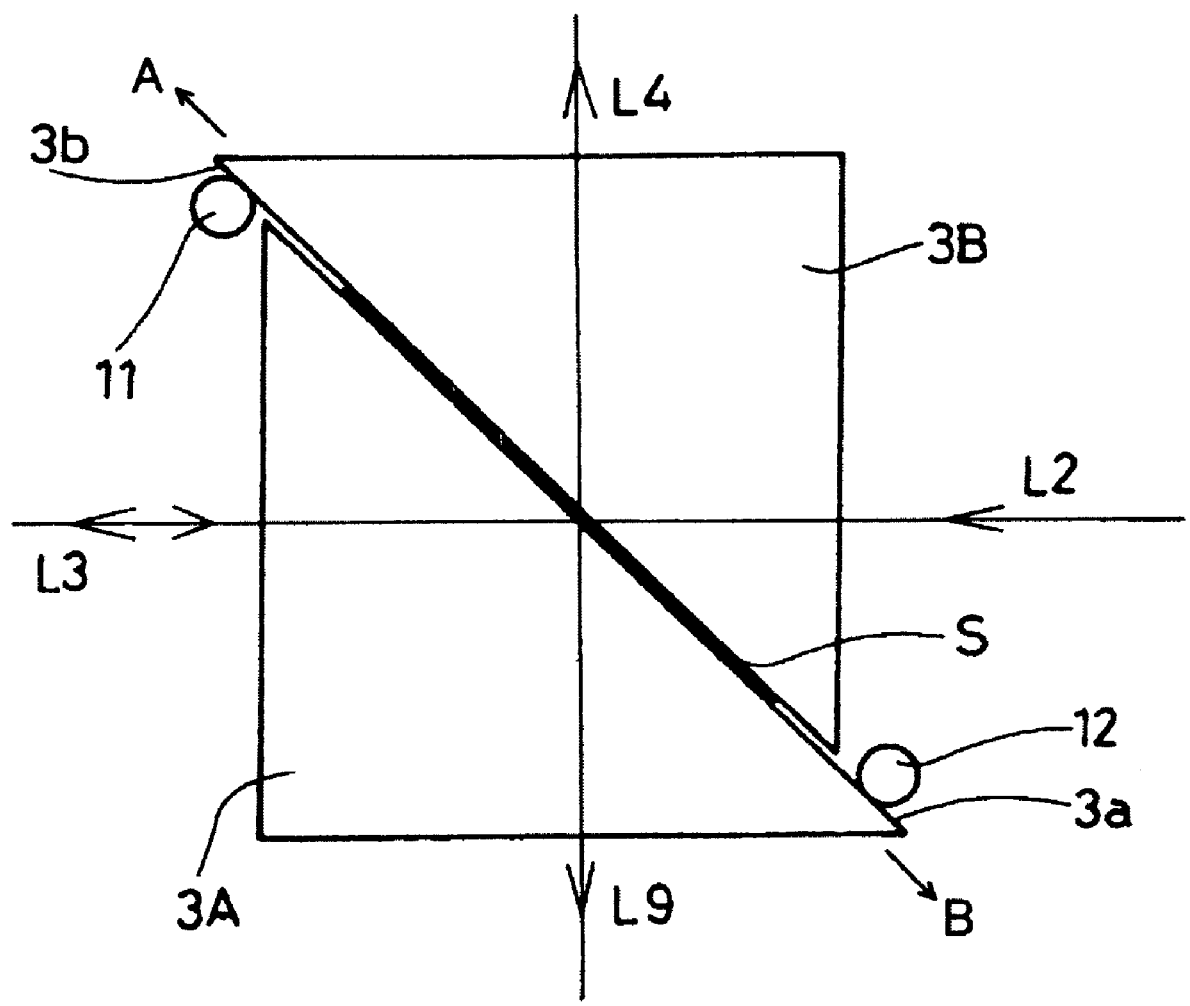
FIG. 3 is a plan view illustrating a main part of another example of a polarization beam splitter.

FIG. 3 is another example according to an embodiment of the present invention. As shown in FIG. 3, the second prism 3A and the first prism 3B are the same in shape and size, and are made up such that the opposed surface 3b of the first prism 3B is displaced in a direction (direction A) toward the second positioning pin 11 with respect to the control surface 3a of the second prism 3A. In the polarization beam splitter 3 with such a configuration, bonding and fixing operations to the base are performed, in a state where the control surface 3a of the second prism 3A is pressed into contact with the first positioning pin 12; and the opposed surface 3b of the first prism 3B is pressed into contact with the second positioning pin 11. The second prism 3A and the first prism 3B may be substantially the same.

Even in the above configuration, since the position of the control film S is determined by the second positioning pin 11 and the first positioning pin 12, the optical characteristics of the optical pickup apparatus can be improved. The configuration is made such that the opposed surface 3b of the first prism 3B is displaced in the direction toward the second positioning pin 11 with respect to the control surface 3a of the second prism 3A, however, it may also be made, to the contrary, such that the opposed surface 3b of the first prism 3B is displaced in a direction (direction B) toward the first positioning pin 12 with respect to the control surface 3a of the second prism 3A.

Figure 4:
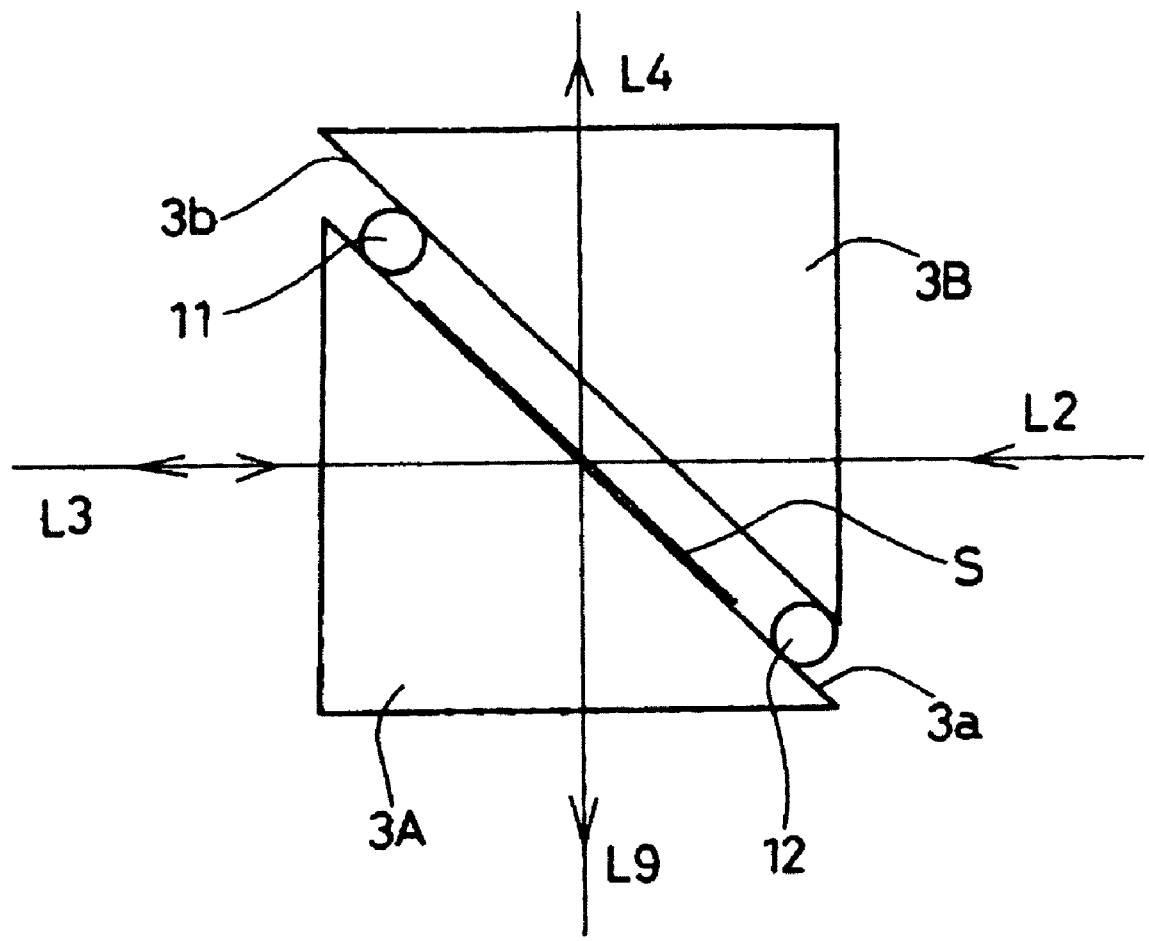
FIG. 4 is a plan view illustrating a main part of still another example of a polarization beam splitter.

FIG. 4 is another example according to an embodiment of the present invention, a configuration is made such that not only that the control surface 3a of the second prism 3A is pressed into contact with the second positioning pin 11 and the first positioning pin 12 on one sides, but also the opposed surface 3b of the first prism 3B is pressed into contact with the second positioning pin 11 and the first positioning pin 12 on the other sides. Even in such a configuration, since the control film S included in the control surface 3a of the second prism 3A can be formed at an accurate position, the optical characteristics of the optical pickup apparatus can be improved.

In such a configuration, since a space portion is interposed between the control film S formed on the control surface 3a of the second prism 3A and the opposed surface 3b of the first prism 3B, an aberration is caused with a change in refractive index, however, this is not a problem if such an aberration is corrected by the first prism 3B.

The above embodiments of the present invention are simply for facilitating the understanding of the present invention and are not in any way to be construed as limiting the present invention. The present invention may variously be changed or altered without departing from its spirit and encompass equivalents thereof.

The control film S is formed on all or a part of the control surface 3a of the second prism 3A by coating, etc. When the control film S is formed on all of the control surface 3a, the first positioning pin 12 and the second positioning pin 11 are in contact with the control surface 3a through the control film S. On the other hand, when the control film S is formed on a part of the control surface 3a (a part of the surface 3a excluding a place where the first positioning pin 12 and the second positioning pin 11 are in contact with the surface 3a), the first positioning pin 12 and the second positioning pin 11 are in directly contact with the control surface 3a.

What is claimed is:

1. An optical pickup apparatus comprising:
   a polarization beam splitter fixed to a base, the polarization beam splitter including
      a first prism that laser light emitted from a laser diode enters,
      a second prism that return light of the laser light reflected from a signal recording layer of an optical disc enters, and
      a control film that is formed on either one of an opposed surface of the first prism and an opposed surface of the second prism so that the laser light incident on the first prism and the return light incident on the second prism are selectively passed through or reflected from the control film, the opposed surfaces being opposed to each other;
   a first positioning pin provided on the base so as to position the polarization beam splitter; and
   a second positioning pin provided on the base so as to position the polarization beam splitter,
   the polarization beam splitter being fixed to the base in a state where the opposed surface of at least one of the first prism and the second prism is made in contact with at least one of the first positioning pin and the second positioning pin.

2. The optical pickup apparatus according to claim 1, wherein
   each of the first prism and the second prism is in a shape of a triangular prism including a triangular surface having one right angle, and the first prism and the second prism are opposed to each other with respect to surfaces thereof, each of the surfaces being determined by the other two angles of the triangular surface, as the opposed surfaces.

3. The optical pickup apparatus according to claim 2, wherein:
   the first prism is smaller than the second prism;
   the opposed surfaces of the first prism and the second prism are bonded through the control film so that the opposed surface of the first prism is arranged between the first positioning pin and the second positioning pin; and
   the polarization beam splitter is fixed to the base in a state where one end portion and the other end portion of the opposed surface of the second prism are made in contact with the first positioning pin and the second positioning pin, respectively.

4. The optical pickup apparatus according to claim 2, wherein:
   the first prism is substantially the same as the second prism;
   the opposed surfaces of the first prism and the second prism are bonded through the control film in a state where either one of the opposed surfaces is displaced in a direction toward the first positioning pin or the second positioning pin; and
   the polarization beam splitter is fixed to the base in a state where one end portion of the opposed surface of the first prism is made in contact with the first positioning pin and one end portion of the opposed surface of the second prism is made in contact with the second positioning pin.

5. The optical pickup apparatus according to claim 2, wherein
   the polarization beam splitter is fixed to the base in a state where the opposed surface of the first prism is made in contact with the first positioning pin on one side and in contact with the second positioning pin on one side, and the opposed surface of the second prism is made in contact with the first positioning pin on the other side and in contact with the second positioning pin on the other side.

6. The optical pickup apparatus according to claim 5, wherein:
   the control film is formed on the opposed surface of the second prism; and
   the first prism corrects aberration of the laser light incident on the first prism.

* * * * *